(12) United States Patent
Go

(10) Patent No.: US 7,091,981 B2
(45) Date of Patent: Aug. 15, 2006

(54) DATA BUS COMPRESSING APPARATUS

(75) Inventor: Yong-Suk Go, Kumi-shi (KR)

(73) Assignee: L.G.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/982,829

(22) Filed: Oct. 22, 2001

(65) Prior Publication Data

US 2002/0024514 A1    Feb. 28, 2002

Related U.S. Application Data

(62) Division of application No. 09/170,526, filed on Oct. 13, 1998, now Pat. No. 6,320,590.

(30) Foreign Application Priority Data

Feb. 25, 1919 (KR) .................................. 98-6028

(51) Int. Cl.
*G06T 9/00* (2006.01)
(52) U.S. Cl. ............... 345/555; 345/204; 345/567; 341/63; 341/145; 382/232; 382/233; 382/235
(58) Field of Classification Search ........... 345/555, 345/204, 567; 341/63, 144, 145, 156, 158; 382/232, 233, 243, 244, 251, 235
See application file for complete search history.

(56) References Cited

U.S. PATENT DOCUMENTS

| | | | | |
|---|---|---|---|---|
| 4,244,259 A * | 1/1981 | Koike | .......................... | 84/604 |
| 4,348,659 A | 9/1982 | Fujimori et al. | .............. | 341/58 |
| 4,859,871 A * | 8/1989 | Kobayashi et al. | ......... | 327/333 |
| 4,951,139 A * | 8/1990 | Hamilton et al. | ...... | 375/240.07 |
| 5,081,450 A | 1/1992 | Lucas | .......................... | 340/728 |
| 5,115,450 A | 5/1992 | Arcuri | ........................ | 375/219 |
| 5,408,498 A | 4/1995 | Yoshida | | |
| 5,420,587 A * | 5/1995 | Michel | ........................ | 341/156 |
| 5,585,796 A | 12/1996 | Svensson et al. | ........... | 341/155 |
| 5,815,080 A * | 9/1998 | Taguchi | ....................... | 340/635 |
| 5,847,616 A * | 12/1998 | Ng et al. | ....................... | 331/57 |
| 5,850,540 A * | 12/1998 | Furuhashi et al. | .......... | 345/501 |
| 5,883,925 A * | 3/1999 | Sinibaldi et al. | ............. | 375/241 |
| 5,930,398 A * | 7/1999 | Watney | ....................... | 382/239 |
| 6,064,771 A * | 5/2000 | Migdal et al. | .............. | 382/232 |
| 6,078,361 A | 6/2000 | Reddy | ......................... | 348/558 |
| 6,218,968 B1 * | 4/2001 | Smeets et al. | ................ | 341/65 |
| 6,222,398 B1 * | 4/2001 | Kondo | ......................... | 327/143 |
| 6,404,670 B1 * | 6/2002 | Shau | ........................... | 365/154 |

FOREIGN PATENT DOCUMENTS

| | | |
|---|---|---|
| JP | 6095618 | 4/1994 |
| JP | 9081081 | 3/1997 |
| JP | 9168147 | 6/1997 |
| JP | 9244572 | 9/1997 |

* cited by examiner

*Primary Examiner*—Bipin Shalwala
*Assistant Examiner*—Vincent E. Kovalick
(74) *Attorney, Agent, or Firm*—McKenna Long & Aldridge LLP

(57) ABSTRACT

A bus compression apparatus for compressing data is provided to suppress an EMI signal and to simplify a data bus structure. In the apparatus, the voltage levels of the digital output signals are summed in accordance with the resistance values of the data compression circuit to produce a compressed analog signal. The compressed analog signal is transmitted through a bus lines to a data decompressor which reproduces the digital data in response to the voltage levels of the compressed analog signal.

22 Claims, 6 Drawing Sheets

DATA BUS COMPRESSING APPARATUS

This application is a Divisional of Application Ser. No. 09/170,526 filed on Oct. 13, 1998 now U.S. Pat. No. 6,320,590.

BACKGROUND OF THE INVENTION

1. Field of the Invention

This invention relates to a bus compression device for reducing or compressing the number of bit signals representing parallel data. This invention is also directed to a bus decompression device for extending the number of bit signals representing compressed parallel data. Further, this invention relates to a data interface employing a bus compressing method and to a liquid crystal display using the data interface.

2. Description of the Prior Art

Since the transmission of audio information many years ago, higher band or capacity signals containing text information, video information and the like have been transmitted using various bus interfaces to transmit signals containing substantially more information than the audio information. The text information, video information and the like occupy a high frequency band and require many transmission lines. As the frequency band for the information and the number of transmission lines increase, an electromagnetic interference(EMI) increases between the transmission lines. The EMI problem is common in a data bus. In order to reduce the EMI in the transmission line, line matchers have been usually added to the transmission line. However, such line matcher complicates a wiring structure of the transmission line and limits the system design.

For example, as shown in FIG. 1, a computer system employing a liquid crystal display(LCD) includes various kinds of couplers LM1 to LM5 provided between a video card 12 in a computer body 10 and data driver integrated circuits D-ICs 24 in an LCD 20. Specifically, twenty-eight first line matchers LM1 corresponding to a 18-bit first bus 11 and a 10-bit first control bus 13 are arranged between the video card 12 and a first cable connector 16. Eighteen second matchers LM2 and ten third matchers LM3 respectively corresponding to a 18-bit second bus and a 10-bit control bus 23 are arranged between a second cable connector 18 and a controller 26. Finally, thirty-six fourth line matcher LM4 and seven fifth line matchers LM5 corresponding to a thirty-six bit third bus 35 and a seven bit third control bus are arranged between the controller 26 and the D-ICs 24.

As shown in FIG. 2, each line matcher LM1 includes a resistor R1, a capacitor C1 and an inductor L1 which are connected in the T shape. As shown in FIG. 3, each line matcher LM2 includes a resistor R1, a capacitor C2 and two inductors L2 and L3. As shown in FIG. 4, each line matcher LM3 includes an inductor L4 and a resistor R3. Each line matcher LM4 includes a resistor R4 and a capacitor C3 as shown in FIG. 5. The line matcher LM5 includes an inductor L5, a resistor R5 and a capacitor C4.

The matchers LM1 to LM5 match an impedance and eliminate high frequency and/or low frequency components, thereby suppressing an occurrence of EMI. As a result, the data passing through the flexible printed circuit (FPC) cable 16 and the first to third data buses 11, 21 and 25 and the clock and timing signals transmitted through the FPC cable 16 and the first to third control buses 13, 23 and 27 are not influenced by the EMI.

As described above, in the conventional computer system having a number of line matchers installed in the transmission line extending from the video card in the computer body to the D-ICs in the LCD, the configuration thereof becomes complicated and the design thereof is limited due to the line matchers. Also, the conventional computer system requires as many transmission lines as the number of data bits.

Furthermore, as the number of picture elements or pixels in the liquid crystal panel increase above the XGA format, the data bus installed between the controller and the D-ICs must have a dual structure due to a response speed of the D-ICs. In this case, the circuit configuration of the LCD having a wiring structure becomes more complicated and a die arranged with the D-ICs must be enlarged.

SUMMARY OF THE INVENTION

Accordingly, it is an object of the present invention to provide a bus compressing apparatus which is capable of compressing data in such a manner to suppress an EMI as well as to simplify a data bus.

Further object of the present invention is to provide a bus decompressing apparatus for decompressing the data compressed by the above-mentioned compressing method.

Another object of the present invention is to provide an interfacing unit that is suitable for reducing the number of transmission lines.

Still another object of the present invention is to provide a liquid crystal display wherein the wiring structure and circuit configuration thereof are simplified.

In order to achieve these and other objects of the invention, a bus compressing apparatus according to one aspect of the present invention includes at least two bit lines for receiving a bit data stream each; at least two voltage control means, each provided in the at least two bit lines, for changing voltage levels on each line into a ratio different each other; and adder means for adding the voltage levels changed by the at least voltage control means to generate and transfer an analog signal.

A bus decompressing apparatus according to another aspect of the present invention includes means for receiving a single of analog signal in which at least two parallel bit data are compressed; quantizing means for quantizing the analog signal from the receiving means; and coding means for coding the quantized analog signal to reconstruct the at least two bit parallel data.

A data interfacing apparatus according to still another aspect of the present invention includes bus compressing means for compressing at least two bit parallel data into a single of analog signal; and bus decompressing means, being installed in a data terminal, for decompressing for decompressing the analog signal from the data compressing means into the at least two bit parallel data.

A liquid crystal display according to still another aspect of the present invention includes driver integrated circuits for divisionally driving a liquid crystal panel with at least two bit video data; signal input means for inputting a single analog signal, in which the at least two video data are compressed, from the exterior; and bus decompressing means for decompressing the analog signal from the signal input means into the at least two bit video data and for supplying the decompressed video data to the driver integrated circuits.

BRIEF DESCRIPTION OF THE DRAWINGS

These and other objects of the invention will be apparent from the following detailed description of the embodiments of the present invention with reference to the accompanying drawings.

DETAILED DESCRIPTION OF THE PREFERRED EMBODIMENT

Figure 1:
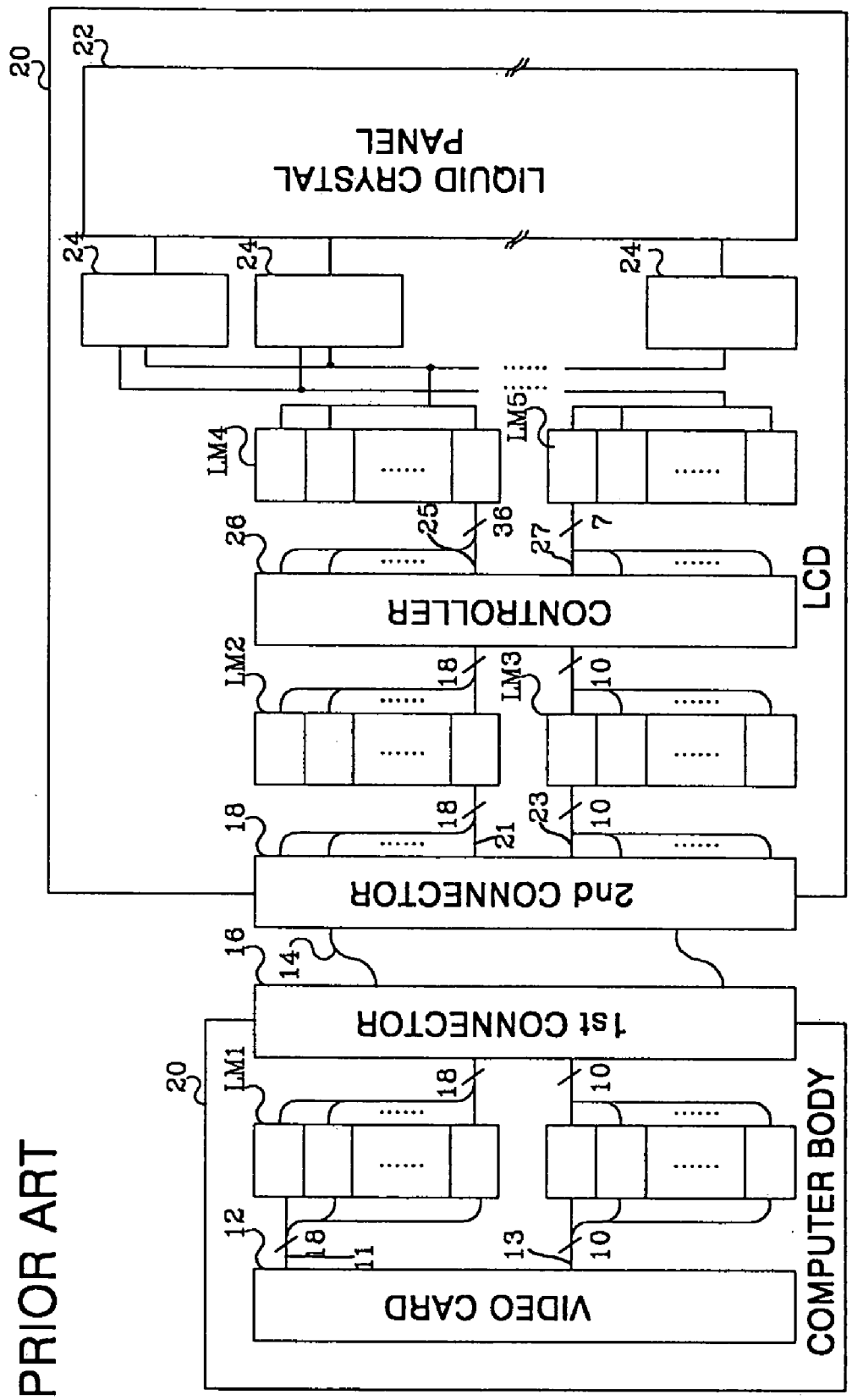
FIG. 1 is a schematic view of a conventional computer system including a liquid crystal display.
Figure 2:
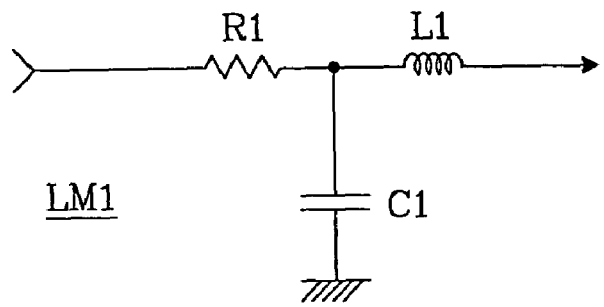
FIG. 2 is a circuit diagram of the first matcher shown in FIG. 1.
Figure 3:
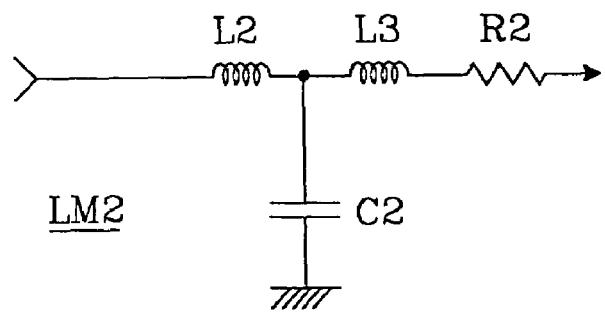
FIG. 3 is a circuit diagram of the second matcher shown in FIG. 1.
Figure 4:
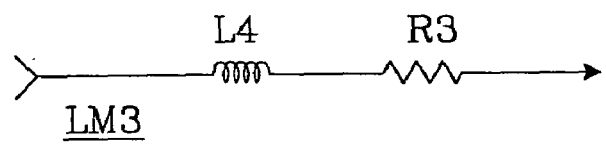
FIG. 4 is a circuit diagram of the third matcher shown in FIG. 1.
Figure 5:
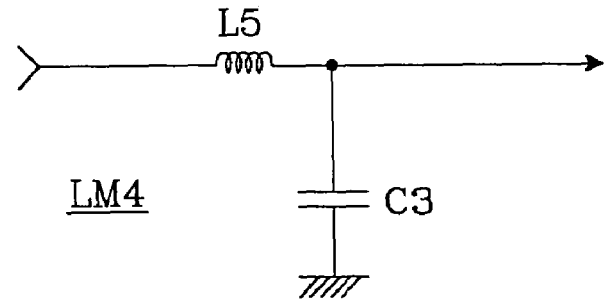
FIG. 5 is a circuit diagram of the fourth matcher shown in FIG. 1.
Figure 6:
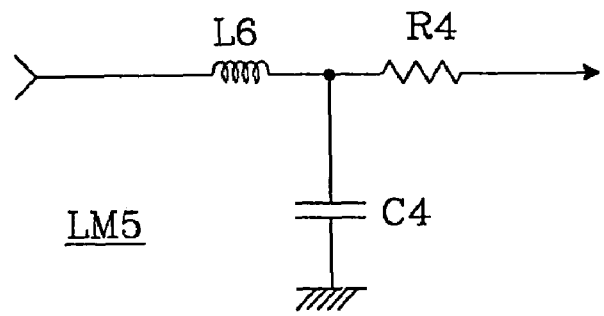
FIG. 6 is a circuit diagram of the fifth matcher shown in FIG. 1.
Figure 7:
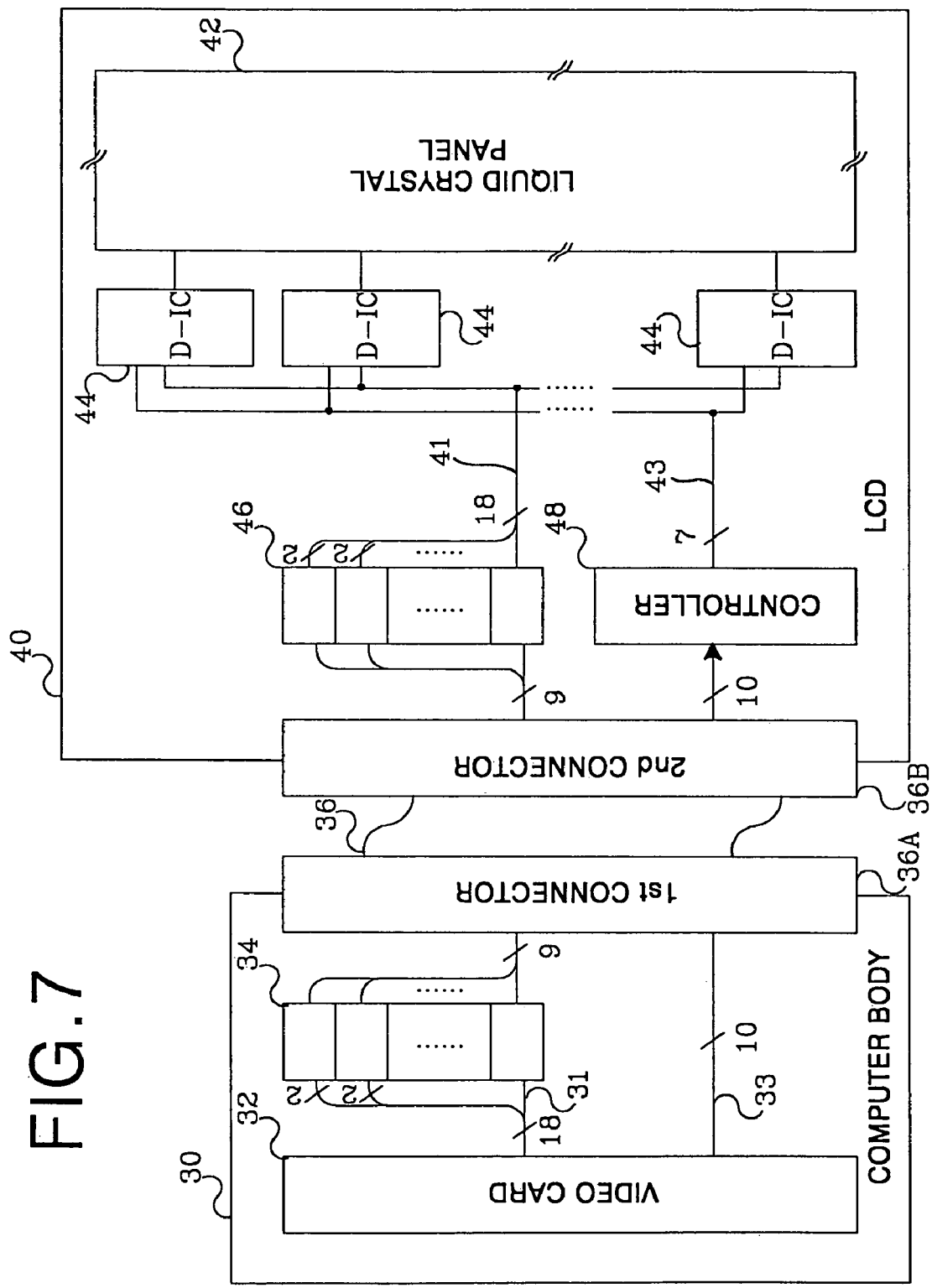
FIG. 7 is a schematic view of an LCD computer system employing a bus compressor and a bus decompressor according to an embodiment of the present invention.

Referring to FIG. 7, there is shown a computer system to which an interfacing device adopting the correlation modulation scheme according to a preferred embodiment of the present invention. As shown in FIG. 7, the computer system includes a computer body 30 having a video card 32 and a bus compressor 34, and an LCD 40 connected to the video card 32 and the bus compressor over an FPC cable 36. The video card 32 is responsible for converting text and image information into video data in such a manner that the information is displayed as a picture by means of the LCD 40. The video data generated by the video card 32 include red(R), green(G), and blue(B) data for each pixel. Each one of the R, G, and B data has a 6-bit length, and hence the video data has a 18-bit length for each pixel.

The video data VD comprising 18 bit lines are supplied, via a first bus line 31, to the bus compressor 34. Further, the video card 32 applies control signals including a data clock representing a period of the video data VD as well as various timing signals, via the first control bus 33, to a first connector 36A of the FPC cable 36.

The bus compressor 34 compresses the 18-bit video data VD from the first data bus 31 to 9-analog signals. Specifically, the bus compressor 34 modulates 2 bit data from two bit lines of the first data bus 31 to a single analog signal having a different amplitude signal AMS in accordance with logical values of the 2 bit data. To this end, the bus compressor 34 includes 9-bus compression cells connected to two separate bit lines among the 18 bit lines of the first data bus 31. The 9-analog signals AMS generated by the bus compressor 34 in this manner are transferred to the LCD 40 over the FPC cable 36. As described above, the 18 bit video data are compressed into the 9-analog signals to reduce the number of lines in the FPC cable 36.

The LCD 40 includes a number of D-ICs 44 for divisionally and selectively driving the pixels in the liquid crystal panel 42, a bus decompressor 46 for receiving the 9-analog signals AMS from a second connector 36B of the FPC cable 36, and a controller 48 for receiving 10-control signals from the second connector 36B of the FPC cable 36. The bus decompressor 46 quantizes and codes the 9-analog signals AMS from the second connector 36B of the FPC cable 36 to substantially reconstruct 18-bit video data VD.

The bus decompressor 46 includes 9-bus decompression cells(not shown) responsive and corresponding to the 9-analog signals AMS. The reconstructed video data VD are commonly supplied, via a second data bus 41 comprising 18-bit lines, to the D-ICs 44. The controller 48 also applies the 7-control signals for controlling the operation of the D-ICs 44 using the 10-control signals from the second connector 36B of the FPC cable 36, via the second control bus 43, to the D-ICs 44. The D-ICs 44 sequentially receive the decompressed video data VD from the second data bus 41 comprising 7-control signals from the second control bus 43. The video data VD for one pixel line are distributively and simultaneously inputted to each D-IC 44 the output of which are supplied to the liquid crystal panel 42 to drive the pixels for one line. Such operations of the D-ICs 44 and the liquid crystal panel 22 are repeated for the number of pixel lines, thereby displaying a single image.

The respective 2-bit data are compressed into a single analog signal by the bus compression cells. As a result, the line number of FPC cable transmitting the video data is reduced to ½ and power consumed for the transmission of the video data is reduced. As a result, the EMI outputted from the FPC cable is reduced.

Further, if the bus decompressor 46 are located within each D-ICs 44 and an analog signal is applied from the second connector 36B of the FPC cable 36 to the D-ICs 44, then the EMI generated in the video data transferred from the video card 32 to the D-ICs 44 can be minimized and the wiring structure between the second connector 36B of the FPC cable 36 and the D-ICs 44 can be simplified.

Moreover, if that the bus compression cells of the bus compressor 34 compress 3 or more bits of data rather than 2 bits of data into a single of analog data, then the line number of FPC cable can be further reduced and the wiring structure between the second connector 36B and the D-ICs 44 can be further simplified.

Figure 8:
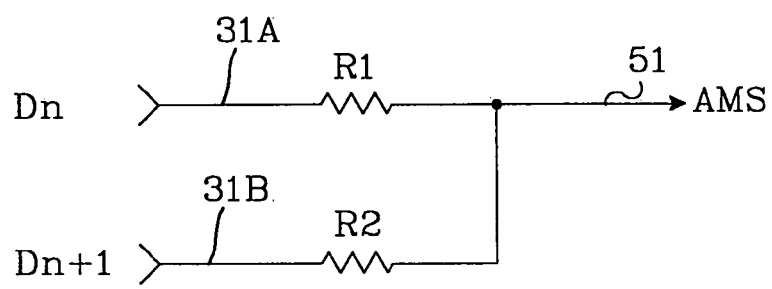
FIG. 8 is a circuit diagram of the bus compressor shown in FIG. 7.

FIG. 8 is a circuit diagram of the bus compression cell included in the bus compressor 34 shown in FIG. 7. The bus compression cell includes a first resistor R1 connected between, for example, an odd-numbered bit line 31A of the first data bus 31 and an output line 51, and a second resistor R2 connected between, for example, an even-numbered bit line 31B of the second data bus 31 and the output line 51. The first resistor R1 drops a voltage level of the odd-numbered bit data Dn from the odd-numbered bit line 31A by ⅓ and delivers the reduced voltage signal to the output line 51. The second resistor R2 drops a voltage level of the even-numbered bit data Dn+1 from the even-numbered bit line 31B by ⅔ and delivers the reduced voltage signal to the output line 51.

Accordingly, the output line 51 outputs an analog signal AMS (Amplitude Modulated Signal) having a sum voltage of voltage signals dropped by the first and second resistors R1 and R2 at the bit transmission line 36A. The analog signal emerging at the output line 51 are applied to the second connector 36A of the FPC cable 36 in FIG. 7.

Figure 9:
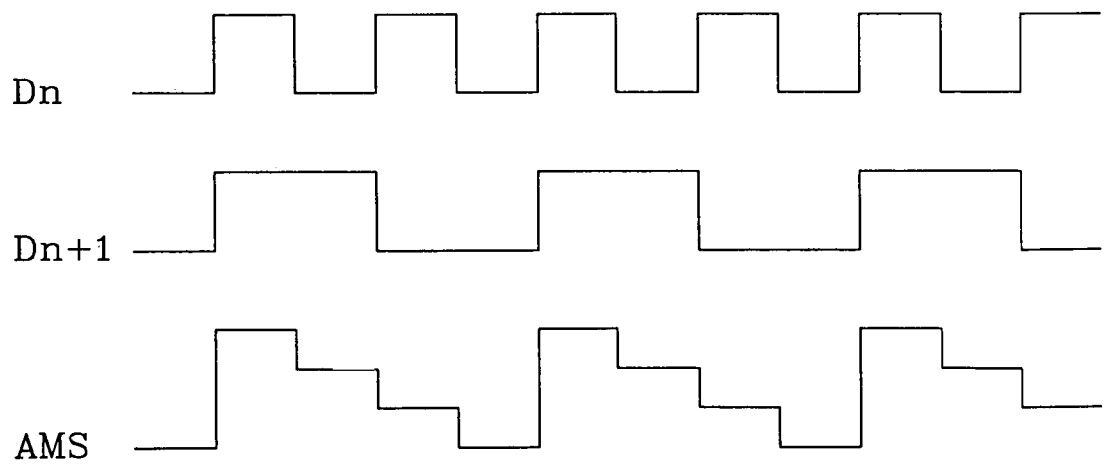
FIG. 9 is input and output waveform diagrams of the circuit shown in FIG. 8.

As shown in FIG. 9, the analog signal AMS has an amplitude varying in accordance with a logical value of the 2 bit data Dn and Dn+1 from the odd-numbered and even-numbered bit lines 31A and 31B. Such an analog signal AMS has an average voltage corresponding to ½ of the video data to consume only a power corresponding to ¼ compared with the video data VD. As a result, the first and second resistors R1 and R2 serve to convert 2 bit parallel data into an amplitude signal. To this end, the first and second resistors R1 and R2 are set to have a resistance value ratio of 2 to 1.

Similarly, if the bus compression cell of the bus compressor 34 is used for compressing 3-bits of data, then there are three resistors R1, R2 and R3 outputs of which are connected together. In such case, the values of R1, R2 and R3 are set to have a ratio of 4 to 2 to 1, respectively.

Figure 10:
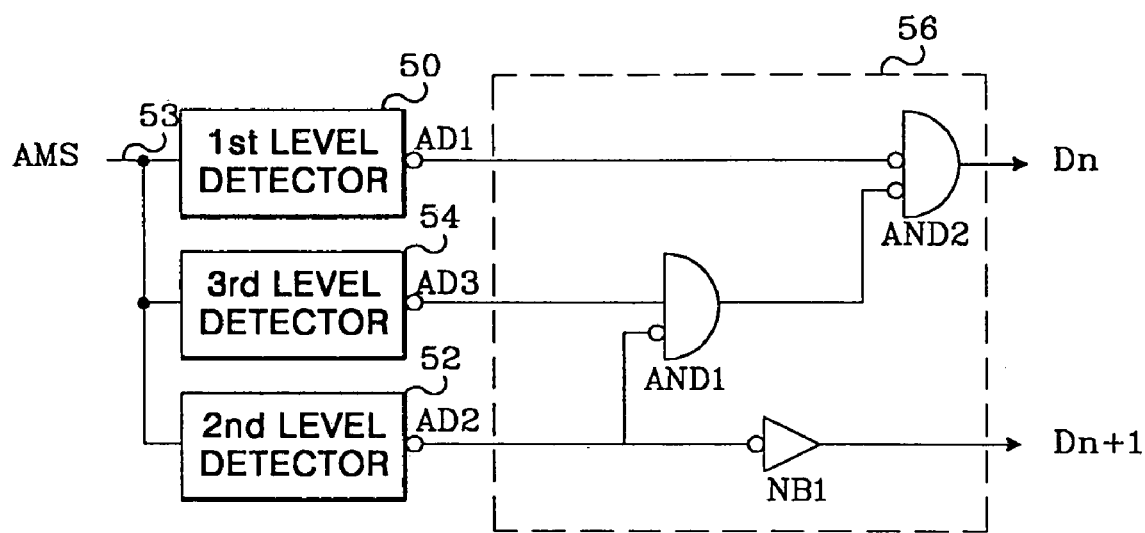
FIG. 10 is a circuit diagram of the bus decompressor shown in FIG. 7.
Figure 11:
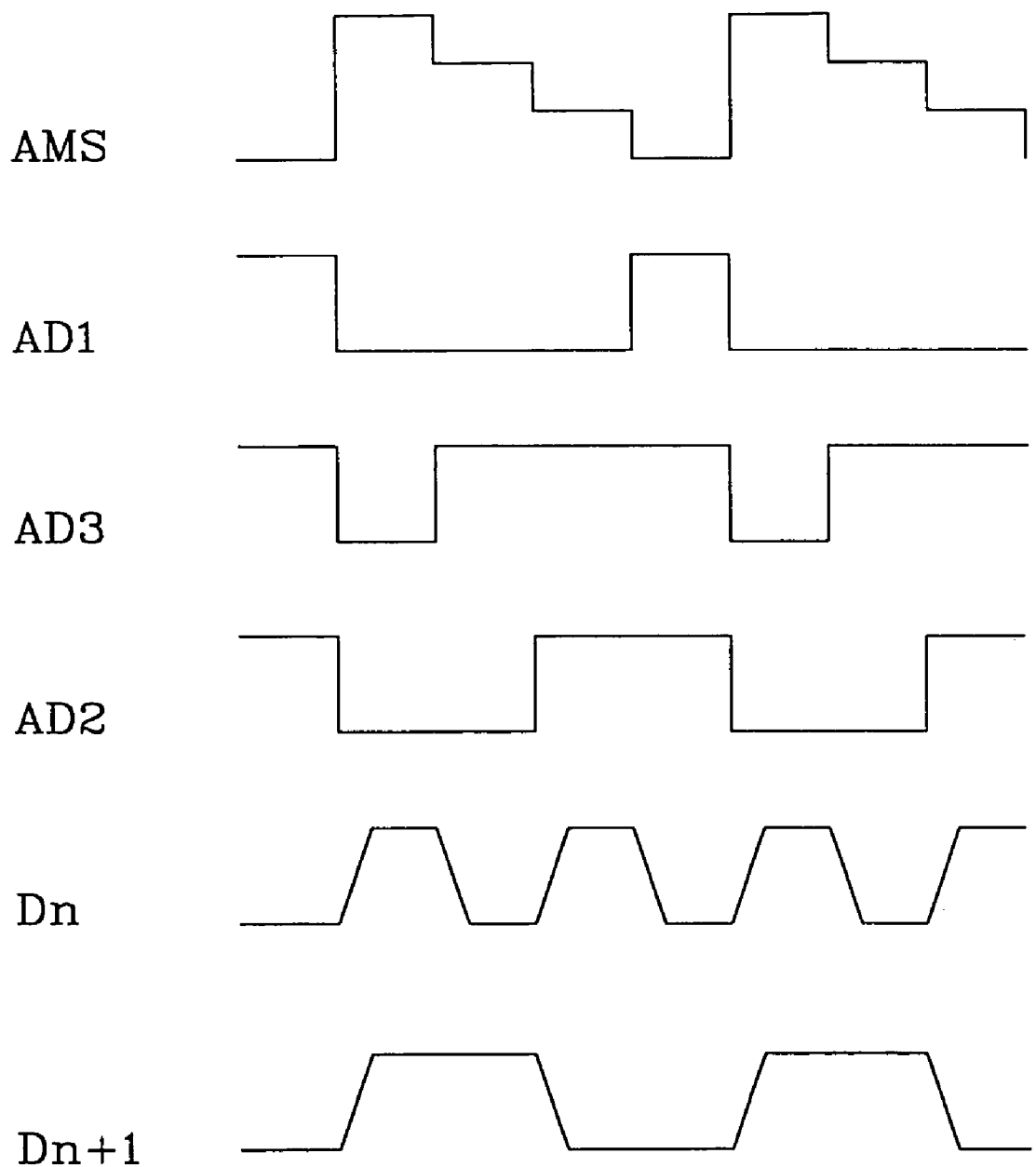
FIG. 11 is operational waveform diagrams of the bus decompressor shown in FIG. 10.

FIG. 10 is a circuit diagram of the bus decompression cell included in the bus decompressor 46 in FIG. 7. FIG. 11 is operational timing diagrams of each part of the bus decompressor 46 shown in FIG. 10. Referring now to FIG. 10, the bus decompression cell includes first to third level detectors 50, 52 and 54 which are commonly connected to an input line 53 coupled with the second connector 36B of the FPC cable 36 in FIG. 7, and a coder 56 for coding the output signals of the level detectors 50, 52 and 54. The first to third level detectors 50, 52 and 54 detect a voltage level (i.e., amplitude) of an analog signal AMS from the bus compressor 34. A sample AMS signal is shown in FIG. 11.

The first level detector 50 generates a low logic of first amplitude detection signal AD1 when the analog signal AMS is above a first predetermined voltage level. The second amplitude detection signal AD2 generates a low logic of second amplitude detection signal AD2 when the analog signal AMS is above a second predetermined voltage level. The third amplitude detection signal AD3 generates a low logic of third amplitude detection signal AD3 when the analog signal AMS is above a third predetermined voltage level. The first to third amplitude detection signals AD1 to AD3 indicate an amplitude value (or a quantized value) of the analog signal AMS. As a result, the first to third level detectors 50, 52 and 54 serve to quantize the analog signal AMS.

The coder 56 codes the amplitude values assigned by the first to third amplitude detection signals AD1 to AD3 from the first to third level detectors 50, 52 and 54 into 2 bit data. The low order bit data and the high order bit data coded by the coder 56 are used as the odd-numbered bit data Dn and the even-numbered bit data Dn+1, respectively. The second level detection signal AD2 generated at the second level detector 52 is used as the even-numbered bit data Dn+1. On the other hand, the odd-numbered bit data Dn are generated by logically combining the first to third level detection signals AD1 to AD3. To this end, the coder 56 includes first and second AND gates AND1 and AND2, and a negative logic buffer NB1. The odd-numbered and even-numbered bit data Dn and Dn+1 reconstructed in this manner are supplied to the second data bus 41 in FIG. 7.

Figure 12:
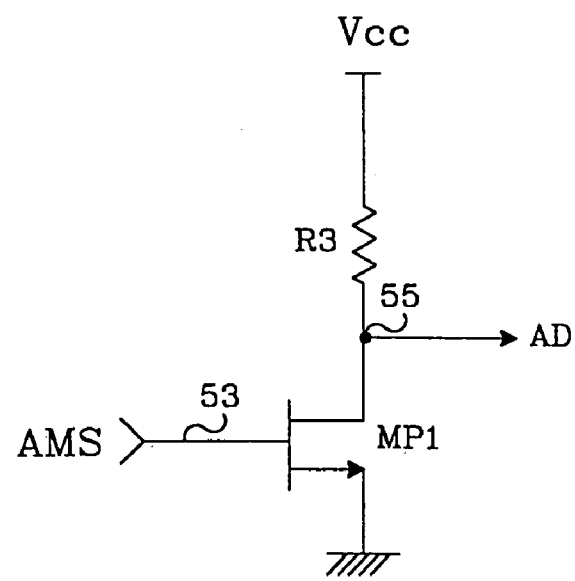
FIG. 12 is a circuit diagram of first to third level detectors shown in FIG. 10.

FIG. 12 is a circuit diagram of an embodiment of the level detectors 50 to 54 shown in FIG. 10. The respective level detectors 50, 52 and 54 include an NMOS transistor MP1 connected to an input line 53, a ground GND and the node 55, and a third resistor R3 connected between the node 55 and a power supply Vcc. The NMOS transistor MP1 bypasses a voltage at the node 55 to the ground GND when an analog signal AMS applied from the input line 53 to the gate terminal thereof is greater than a threshold voltage Vth of the transistor MP1, thereby generating a low logic of amplitude detection signal AD. Alternatively, the NMOS transistor MP1 opens the node 55 from the ground GND when the analog signal AMS applied from the input line 53 to the gate terminal thereof is less than the threshold voltage Vth, thereby generating a high logic of amplitude detection signal AD on the node 55. The threshold voltage Vth of the NMOS transistor MP1 is determined depending on the voltage levels to be detected by the level detectors 50, 52 and 54. Specifically, the threshold voltage Vth of the NMOS transistor MP1 is preferably set to be slightly less than about Vcc/3 in the case of the first level detector 50 detecting a voltage corresponding to ⅓ of the supply voltage Vcc, to about Vcc/3 to Vcc×⅔ in the case of the second level detector 52 detecting a voltage corresponding to ⅔ of the supply voltage Vcc, and to about Vcc×⅔ to Vcc in the case of the third level detector 54 detecting a voltage corresponding to the supply voltage Vcc. Accordingly, an amplitude detection signal AD generated at the node 55 has a high logic when the analog signal AMS is less than the subject detecting voltage while having a low logic when the analog signal AMS is higher than the subject detecting voltage.

As described above, in the bus compressor according to the present invention, at least two-bit data are compressed into a single analog signal, thus reducing the number of transmission lines such as an FPC cable, to at least ½ as well as reducing the power consumption required for the data transmission to at least ¼. As a result, the bus compressor is capable of maximally suppressing the occurrence of the EM1.

Further, in the interfacing device employing the bus compressor and the bus decompressor according to the present invention, at least two parallel bit data are transferred in the form of a single amplitude signal, thus reducing the number of transmission lines for transmitting data as well as the power consumption. Accordingly, the data transferred through the interfacing device according to the present invention are almost not interfered by the EMI. Also, in the interfacing device, a number of line matchers are eliminated to simplify the circuit configuration thereof and to enhance circuit design options.

Further, in the LCD according to the present invention employing the above-mentioned interfacing device, at least two parallel data are inputted to the bus decompressor in the form of a single analog signal, thus reducing the number of transmission lines in the FPC cable as well as the power consumption for the data reception. As a result, the LCD according to the present invention is capable of minimizing an affect of the EMI. Also, the line matchers for suppressing the occurrence of the EMI are eliminated to simplify the circuit configuration. Moreover, in the LCD according to the present invention, the bus decompressor can be mounted in each D-IC and the data transmission line is commonly connected to the D-ICs, thereby further simplifying the wiring structure and reducing the liquid crystal panel dimension.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A bus compressing apparatus comprising:
   at least two bit lines, each bit line transmitting a bit signal having a voltage level;
   at least two voltage control means connected to the corresponding bit lines, wherein each voltage control means changes the voltage level of the bit line at a different ratio from the other voltage control means; and
   adder means for adding voltage levels outputted from the two voltage control means to generate an analog signal.

2. A bus compressing apparatus as claimed in claim 1, wherein the two voltage control means includes a first voltage control means comprising a first resistor and a second voltage control means comprising a second resistor.

3. A bus compressing apparatus as claimed in claim 2, wherein the first resistor and the second resistor have different resistance.

4. A bus compressing apparatus as claimed in claim 2, wherein the resistance value of the second resistor of the second voltage control means is $½^n$ of the resistance value of the first resistor, in which n is an integer.

5. A bus compressing apparatus as claimed in claim 2, wherein the resistance value of the second resistor of the second voltage control means is ½ of the resistance value of the first resistor.

6. A bus compressing apparatus as claimed in claim 2, wherein the adder means performs a wired sum operation.

7. A bus decompressing apparatus comprising:
   receiving means for receiving an analog signal formed by compressing at least n-bit data, wherein n is an integer, and wherein the analog signal includes a range of possible unique voltage levels, each unique voltage level corresponding to an n-bit data value;
   quantizing means for quantizing the analog signal from the receiving means, wherein the quantizing means includes at least $(2^n-1)$ level detectors, and wherein each one of the level detectors includes a transistor controlled by the analog signal, and output voltage control means connected to the transistor to output the quantized analog signal to the coding means in response to the analog signal; and
   coding means connected to the quantizing means for coding the quantized analog signal to reconstruct the n-bit data.

8. A bus decompressing apparatus as claimed in claim 7, wherein the output voltage control means includes a pull-up resistor.

9. A bus decompressing apparatus as claimed in claim 7, wherein the transistor is an NMOS transistor having a threshold voltage which turns on when the analog signal is above the threshold voltage and turns off when the analog signal is below the threshold voltage.

10. A bus decompressing apparatus as claimed in claim 9, wherein the transistor is connected between a source voltage and a ground and the threshold voltage of the transistor for each level detector is different by a voltage value approximately equal to the source voltage divided by the number of level detector in the bus decompressing apparatus.

11. A bus decompressing apparatus as claimed in claim 7, wherein the level detectors each have a transistor with a threshold voltage, wherein the transistor of each level detector turns on when the analog signal is above the threshold voltage corresponding to the level detector.

12. A bus decompressing apparatus as claimed in claim 11, the coding means receives an output of the second level detector to generate an n-th bit data.

13. A bus decompressing apparatus as claimed in claim 7, wherein the coding means transforms the quantized analog signal to n digital signals.

14. A bus compressing apparatus for use in interfacing a controller and a display device for compressing n output signals of the controller, the bus compressing apparatus comprising:
    n voltage converters coupled to the corresponding output signals, wherein n is an integer and each voltage converter changes a voltage level of the corresponding output signal, and outputs of the n voltage converters are connected to produce a combined output signal in response to voltage levels of the n output signals from the controller, and wherein the combined output signal has a plurality of voltage levels representing nth power of the number of output signals.

15. A bus compressing apparatus of claim 14, wherein each one of the n voltage converters includes a resistor.

16. A bus compressing apparatus of claim 15, wherein each resistor in corresponding n voltage converters has a different resistance.

17. A bus compressing apparatus of claim 15, wherein the resistance value of each resistor of then voltage converters is ½ of the resistance value of the resistor for a first voltage converter.

18. A bus decompressing apparatus comprising:
    an input line transmitting an analog signal formed by compressing n-bit data, wherein n is an integer;
    a plurality of level detectors connected in parallel to the input line to output a quantized signal; and
    a coding device connected to the plurality of level detector to code the quantized signal to reconstruct the n-bit data.

19. A bus decompressing apparatus of claim 18, wherein the plurality of level detectors includes at least $(2^n-1)$ level detectors, each level detector being configured to detect different voltage levels of the analog signal.

20. A bus decompressing apparatus of claim 19, wherein each one of the level detectors comprises:
    a transistor controlled by the analog signal from the receiving means; and
    a resistor connected to the transistor to output the quantized signal to the coding device in response to the analog signal.

21. A bus decompressing apparatus of claim 20, wherein the transistor is an NMOS transistor having a threshold voltage which turns on when the analog signal is above the threshold voltage and turns off when the analog signal is below the threshold voltage.

22. A bus decompressing apparatus of claim 21, wherein the transistor is connected between a source voltage and a ground and the threshold voltage of the transistor for each level detector is different by a voltage value approximately equal to the source voltage divided by the number of level detector in the bus decompressing apparatus.

* * * * *

UNITED STATES PATENT AND TRADEMARK OFFICE
CERTIFICATE OF CORRECTION

PATENT NO. : 7,091,981 B2
APPLICATION NO. : 09/982829
DATED : August 15, 2006
INVENTOR(S) : Yong Suk Go Page 1 of 1

It is certified that error appears in the above-identified patent and that said Letters Patent is hereby corrected as shown below:

On the title page, item [30] priority data should read:
(30)  Foreign Application Priority Data Feb. 25, 1998

Signed and Sealed this

Third Day of October, 2006

JON W. DUDAS
*Director of the United States Patent and Trademark Office*